(12) United States Patent
Mason et al.

(10) Patent No.: US 9,465,390 B2
(45) Date of Patent: Oct. 11, 2016

(54) POSITION-CONTROLLED ROBOTIC FLEET WITH VISUAL HANDSHAKES

(71) Applicant: Google Inc., Mountain View, CA (US)

(72) Inventors: Julian Mason, Redwood City, CA (US); Kurt Konolige, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 14/538,047

(22) Filed: Nov. 11, 2014

(65) Prior Publication Data
US 2016/0132059 A1     May 12, 2016

(51) Int. Cl.
| | |
|---|---|
| *G01C 22/00* | (2006.01) |
| *G05D 1/00* | (2006.01) |
| *G05D 1/02* | (2006.01) |
| *B65G 1/137* | (2006.01) |

(52) U.S. Cl.
CPC ........... *G05D 1/0246* (2013.01); *B65G 1/1373* (2013.01); *G05D 1/0287* (2013.01)

(58) Field of Classification Search
CPC ............. G05D 1/0246; G05D 1/0274; G05D 1/0272; G05D 2201/0213; G05D 1/0234
USPC .......................................................... 701/28
See application file for complete search history.

(56) References Cited

U.S. PATENT DOCUMENTS

| | | | |
|---|---|---|---|
| 5,148,591 A | 9/1992 | Pryor | |
| 5,239,931 A | 8/1993 | Muselli et al. | |
| 5,506,682 A | 4/1996 | Pryor | |
| 5,602,967 A | 2/1997 | Pryor | |
| 5,825,981 A | 10/1998 | Matsuda | |
| 6,167,607 B1 | 1/2001 | Pryor | |
| 6,909,940 B2 | 6/2005 | Hellman et al. | |
| 7,602,143 B2 | 10/2009 | Capizzo | |
| 7,646,336 B2 | 1/2010 | Tan et al. | |
| 8,322,591 B2 | 12/2012 | Diez et al. | |

(Continued)

FOREIGN PATENT DOCUMENTS

AU     2010235933     10/2010

OTHER PUBLICATIONS

KIVA Systems, "Defying the Laws of Fulfillment, The KIVA Mobile Fulfillment System," http://www.kivasystems.com/media/45933/kiva%20systems%20brochure%20defying%20the%20laws%20%20fulfillment.pdf, 2007, pp. 1-8.*

(Continued)

*Primary Examiner* — Maceeh Anwari
(74) *Attorney, Agent, or Firm* — McDonnell Boehnen Hulbert & Berghoff LLP

(57) ABSTRACT

Example methods and systems may provide for a system that includes a control system communicatively coupled to a first robotic device and a second robotic device. The control system may identify a collaborative operation to be performed by a first robotic device and a second robotic device that is based on a relative positioning between the first robotic device and the second robotic device. The control system may also determine respective locations of the first robotic device and the second robotic device. The control system may further initiate a movement of the first robotic device along a path from the determined location of the first robotic device towards the determined location of the second robotic device. The first robotic device and the second robotic device may then establish a visual handshake that indicates the relative positioning between the first robotic device and the second robotic device for the collaborative operation.

20 Claims, 15 Drawing Sheets

(56) References Cited

U.S. PATENT DOCUMENTS

| | | |
|---|---|---|
| 8,403,614 B2 | 3/2013 | Bastian, II et al. |
| 8,508,590 B2 | 8/2013 | Laws et al. |
| 8,594,834 B1 | 11/2013 | Clark et al. |
| 8,594,923 B2 | 11/2013 | Wong et al. |
| 2003/0120379 A1 | 6/2003 | Mehlberg et al. |
| 2008/0131255 A1 | 6/2008 | Hessler et al. |
| 2011/0106294 A1 | 5/2011 | Bebbington |
| 2012/0191272 A1 | 7/2012 | Andersen et al. |
| 2013/0009592 A1 | 1/2013 | Larsen et al. |
| 2013/0184849 A1 | 7/2013 | Chan |
| 2013/0317642 A1 | 11/2013 | Asaria et al. |
| 2014/0074342 A1 | 3/2014 | Wong et al. |

OTHER PUBLICATIONS

"A day in the life of a Kiva Robot" retrieved from: https://youtu.be/6KRjuuEVEZs; uploaded on May 11, 2011.*

KIVA Systems, "Defying the Laws of Fulfillment, The KIVA Mobile Fulfillment System," http://www.kivasystenns.com/media/45933/kiva%20systems%20brochure%20-%20defying%20the%20laws%20of%20fulfillment.pdf, 2007, pp. 1-8.

Swieringa et al., "Autonomous Battery Swapping System for Small-Scale Helicopters," 2010 IEEE International Conference on Robotics and Automation, Anchorage Convention District, May 3-8, 2010, Anchorage, Alaska USA, pp. 3335-3340.

Vakazawa K. ED, Institute of Electrical and Electronics Engineers: "Compensation of Robot Hand Position Using Vision Sensor", Proceedings of the International Conference on Industrial Electronics, Control and nstrumental. (IECON), Bologna, Sep. 5-9, 1994, Plenary Session Power Electronics; [Proceedings of the International Conference on Industrial Electronics, Contro, vol. 2 of 3, Sep. 5, 1994, pp. 847-851.

* cited by examiner

POSITION-CONTROLLED ROBOTIC FLEET WITH VISUAL HANDSHAKES

BACKGROUND

Unless otherwise indicated herein, the materials described in this section are not prior art to the claims in this application and are not admitted to be prior art by inclusion in this section.

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may have machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example methods and systems may include a control system that is communicatively coupled to multiple robotic devices that operate within an environment, such as a warehouse or factory. In some instances, the robotic devices may interact with one another by performing various collaborative operations. Such collaborative operations may be based on relative positioning of the robotic devices. For instance, certain relative positioning between a first robotic device and a second robotic device may facilitate transferring an object between the robotic devices. The control system may direct the robotic devices relatively close to one another, or to a location within the environment at which the robotic devices are to perform an operation. Local vision between the robotic devices (or between the robotic devices and the environment) may then establish more precise relative positioning.

In one example, an implementation may involve identifying a collaborative operation to be performed by a first robotic device and a second robotic device that is based on a relative positioning between the first robotic device and the second robotic device. The implementation may further involve determining respective locations, relative to a map, of the first robotic device and the second robotic device. The implementation may also involve initiating a movement of the first robotic device along a path from the determined location of the first robotic device towards the determined location of the second robotic device. The implementation may then involve causing the first robotic device and the second robotic device to establish a visual handshake that indicates the relative positioning between the first robotic device and the second robotic device for the collaborative operation.

In another example implementation, a first robotic device may include a communications interface, one or more processors, and data storage configured to store instructions, that when executed by the one or more processors, cause the first robotic device to perform operations. The operations may include receiving instructions to perform a collaborative operation that is based on a relative positioning between the first robotic device and a second robotic device. The operations may further include receiving data indicating a path towards the second robotic device. The operations may also include initiating movement of the first robotic device along the path towards the second robotic device. The operations may include establishing a visual handshake with the second robotic device that indicates the relative positioning between the first robotic device and the second robotic device for the collaborative operation.

Another example implementation may provide for a system. The system may include a control system communicatively coupled to a first robotic device and a second robotic device. The control system may be configured to perform operations. The operations may include the identifying a collaborative operation to be performed by a first robotic device and a second robotic device that is based on a relative positioning between the first robotic device and the second robotic device. The operations may also include determining respective locations of the first robotic device and the second robotic device. The operations may include initiating a movement of the first robotic device along a path from the determined location of the first robotic device towards the determined location of the second robotic device. The first robotic device and the second robotic device may also be configured to perform operations. The operations may include establishing a visual handshake that indicates the relative positioning between the first robotic device and the second robotic device for the collaborative operation.

Another example implementation may include a means for identifying a collaborative operation to be performed by a first robotic device and a second robotic device that is based on a relative positioning between the first robotic device and the second robotic device. The implementation may include a means for determining respective locations of the first robotic device and the second robotic device. The implementation may also include a means for initiating a movement of the first robotic device along a path from the determined location of the first robotic device towards the determined location of the second robotic device. The implementation may further include a means for establishing a visual handshake that indicates the relative positioning between the first robotic device and the second robotic device for the collaborative operation.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
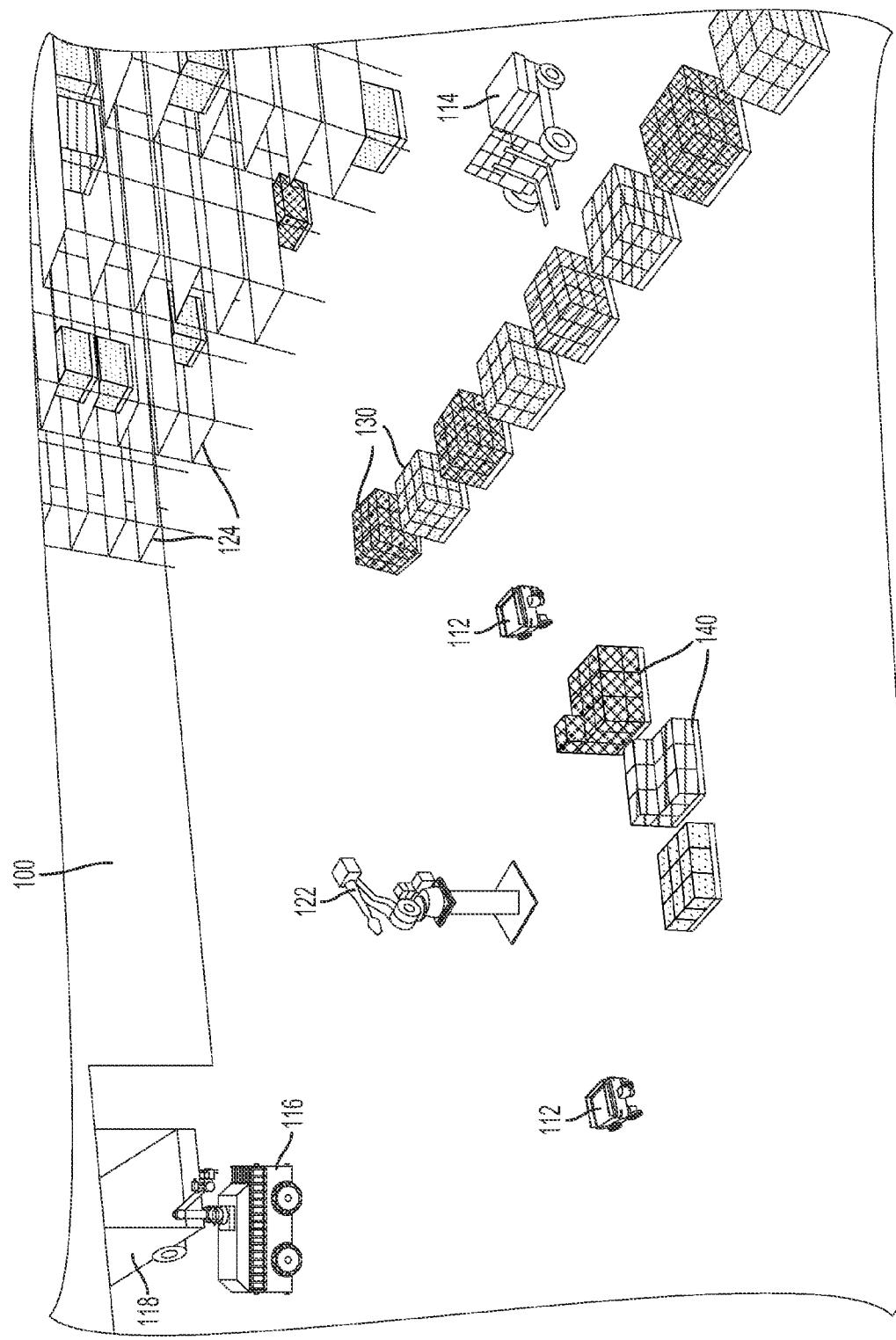
FIG. 1A shows a robotic fleet, according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

Within examples, a centralized control system may be used in conjunction with local vision of respective robotic devices to coordinate operations of a robotic fleet. For instance, the fleet may include different types of robots that may operate collaboratively in a warehouse to process packages for order fulfillment and/or distribution. The centralized control system may navigate robots relatively close to a location at which they might perform a collaborative operation. However, the central planning system might not, in some circumstances, navigate the robotic devices with sufficient precision for some types of collaborative operations, unless the robots are coupled to rails or other measured components are used to precisely control the positions of the robotic devices. Additionally, centralized control systems may sometimes fail in navigation (e.g., a robotic device may get stuck, a package may get dropped and lost, etc.)

Local vision and planning may therefore be used in conjunction with a centralized control system to provide relatively higher precision in relative positioning between robotic devices. For instance, a centralized control system may be used to navigate a robotic device relatively close to a target location, at which point local vision of the robotic device may take over from the centralized control system. In some example systems, the centralized control system may maintain or have access to a map of an environment in which the robotic devices are operating. Based on the map, the centralized control system may navigate robotic devices relatively close to a target location, and then vision and handshakes may supplement the central control system when higher-precision positioning would facilitate the operation. The current placement abilities of certain types of robotic devices such as pallet jacks and fork lifts is sometimes crude, making local vision control advantageous for some operations.

As an example, a robotic pallet jack may be directed to deliver a pallet within a work envelope of a robotic manipulator, such as a robotic arm mounted on a pedestal (i.e., a "pedestal bot"). To get in range of local vision, the robotic pallet jack might need to move the pallet to a roughly two o'clock position with respect to the pedestal bot. A local vision handshake between the robotic pallet jack and pedestal bot may then provide more precise control of operations. For instance, the robotic pallet jack may navigate to a location within the work envelope of the pedestal bot, indicate to the pedestal bot where its position relative to the pedestal bot, and then the pedestal bot may orient a camera in the two o'clock direction to establish a visual handshake with the robotic pallet jack.

The visual handshake may then enable two robots to identify one another by a visual tag (such as an AR tag) or by other characteristics, and to perform collaborative operations involving relative positioning. In additional examples, items (e.g., packages to be shipped) may be provided with visual tags as well or instead, which may be used by robotic devices to perform operations with respect to the items by way of local vision control. In particular, the tags may be used to facilitate manipulation of the items by the robotic devices. For instance, one or more tags on particular locations on a pallet may be used to inform a fork lift where or how to lift up the pallet.

Local robot vision may also provide robustness by inserting redundancy to handle cases where the central planner fails. For instance, as a robotic pallet jack passes by a pallet, the pallet jack may send information indicating the relative positioning of the robotic pallet jack to the pallet to a remote, cloud-based server system. Such information may be used to fix errors in central planning, identify lost objects, etc., perhaps with respect to the map.

In other examples, the centralized control system may also anticipate where robotic devices need to navigate or orient a camera in order to establish a visual handshake. For instance, the centralized control system may instruct the pedestal bot to orient a camera in a roughly two o'clock direction to establish a handshake when the robotic pallet jack comes into range.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading/unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

The robotic fleet may include various types of mobile vehicles. One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Various types of robotic devices other than those illustrated here may be included in an example system. In some examples, one or more robotic devices may use alternative modes of locomotion instead of wheel-based locomotion. For instance, one or more robotic devices may be rotor-driven so as to operate airborne. For instance, an airborne robotic device such as a quadcopter may be used for various tasks such as moving objects or collecting sensor data.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
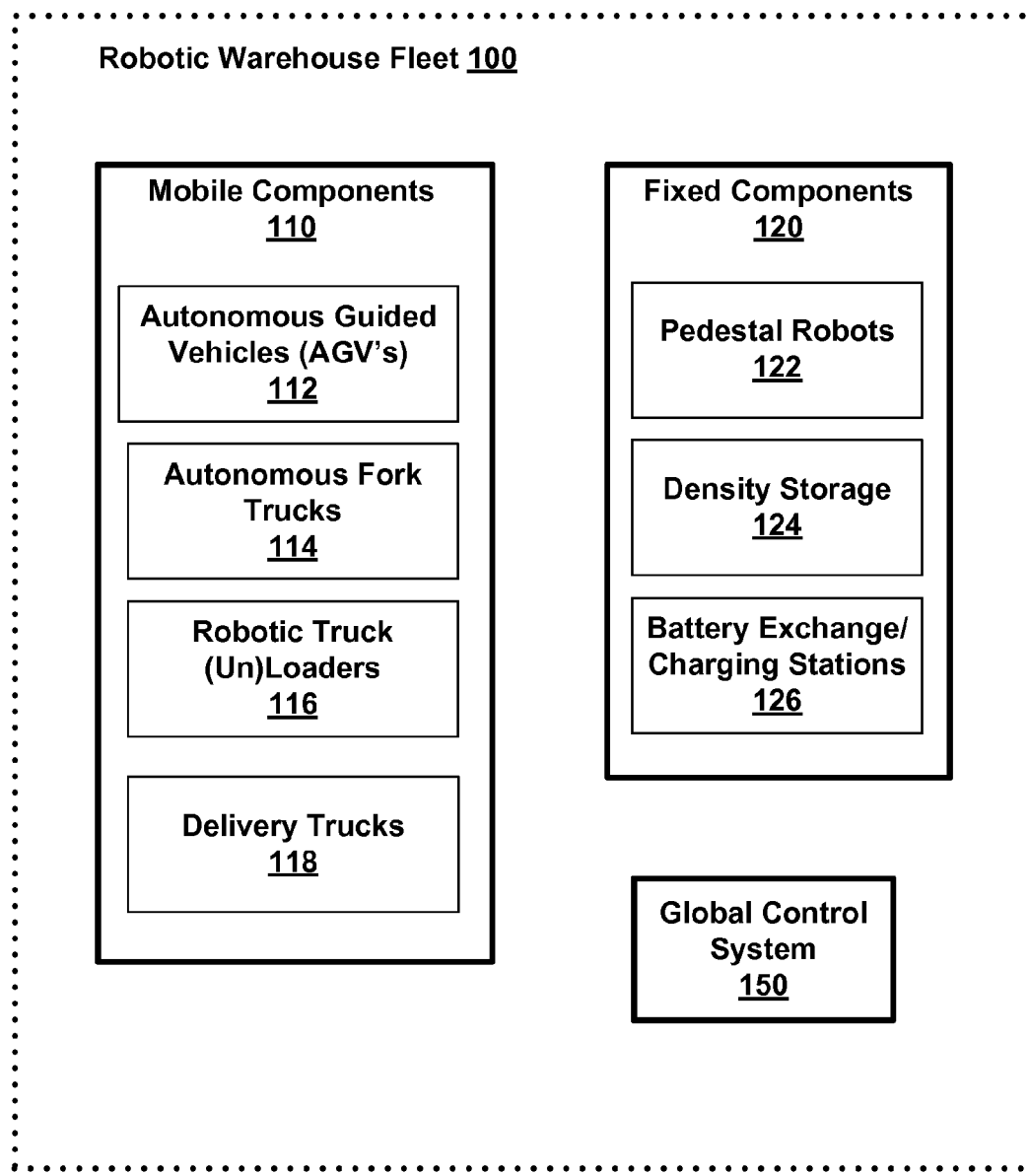
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/ unloaders 116, and delivery trucks 118. The robotic fleet 100 may additionally include one or more fixed components positioned within a warehouse or other environment, such as pedestal robots 122, density storage components 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., by way of wireless communication interfaces) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may maintain or have access to a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could include information on both the current configuration or placement of components within a warehouse (or across multiple warehouses) as well as information about the configuration or placement of components that is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's depleted batteries with recharged batteries, such that robots might not have to wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with three or four batteries. The robotic arm at the station 126 may be configured to lift out the entire bucket of batteries and attach individual batteries to battery chargers on a shelf at the station 126. The robotic arm may then find charged batteries to replace the depleted batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
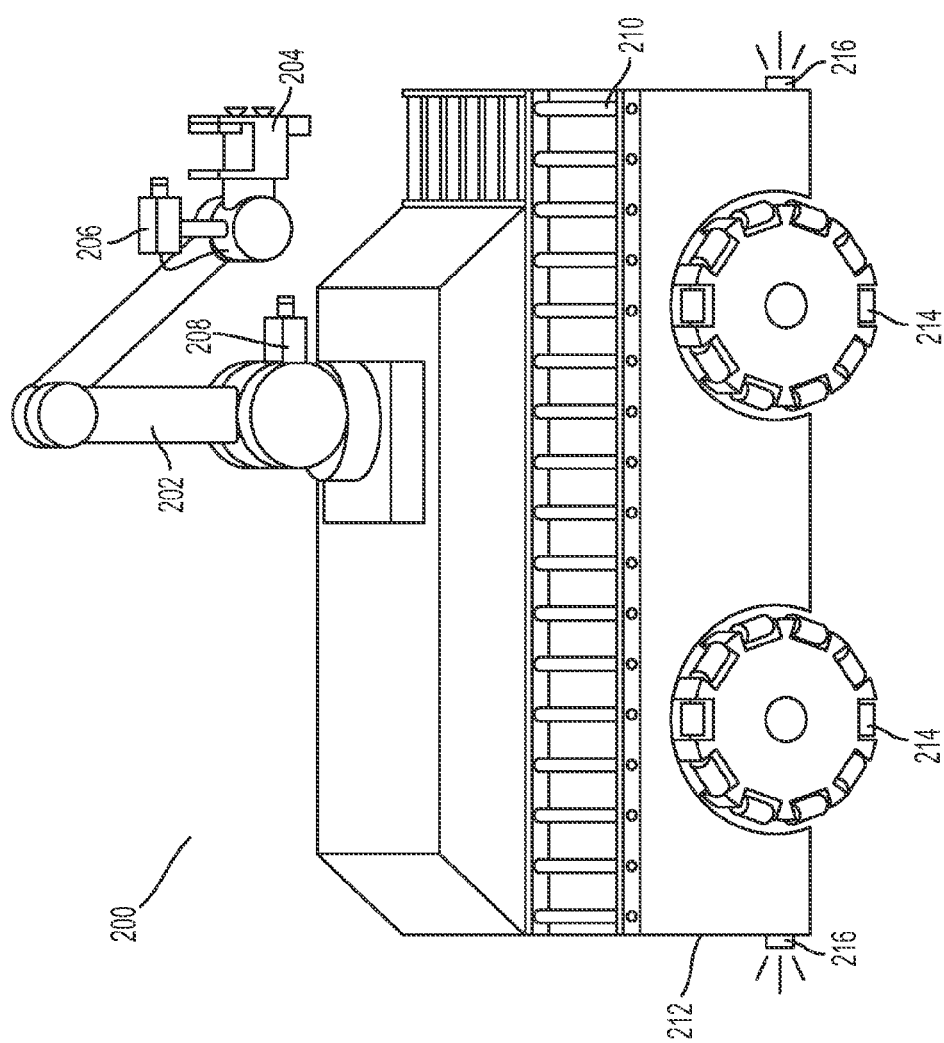
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap-around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be 2D sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
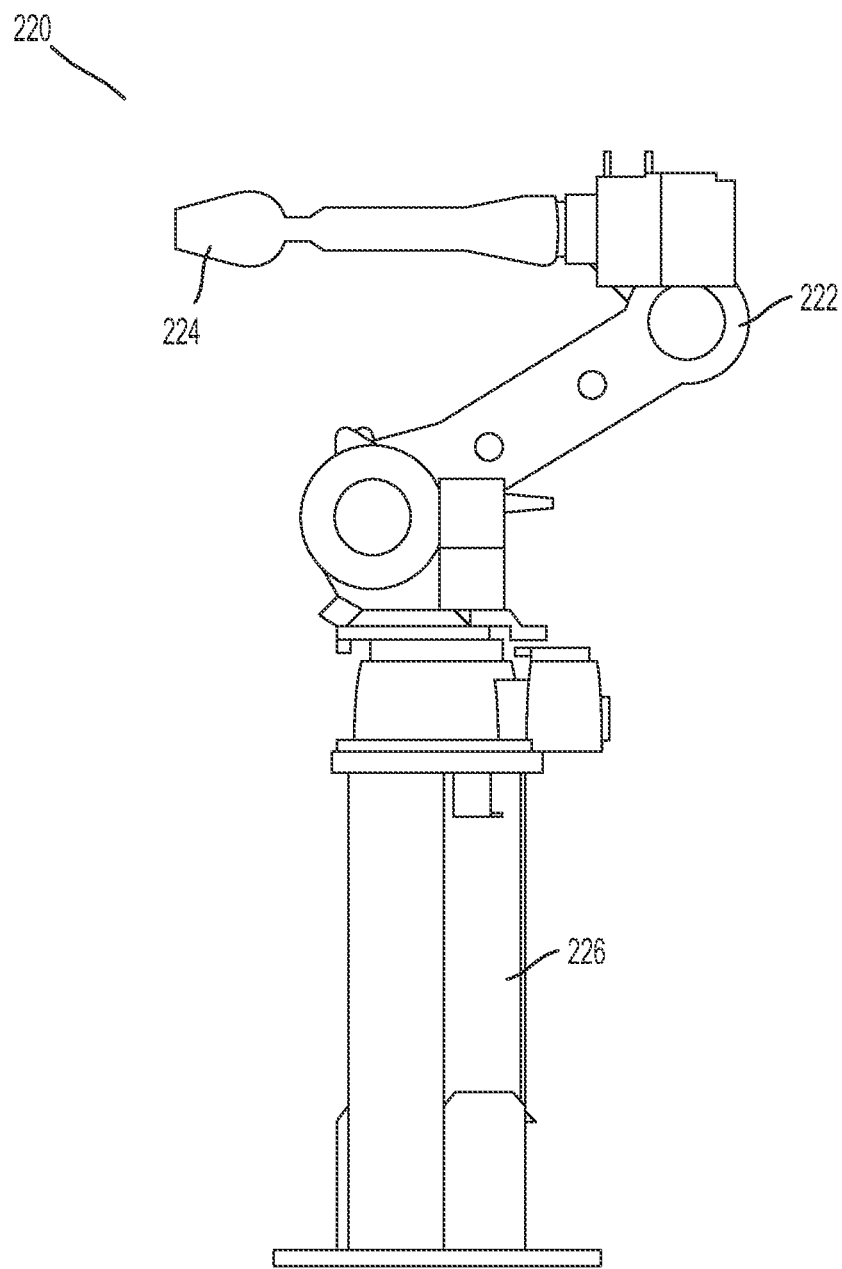
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In further examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
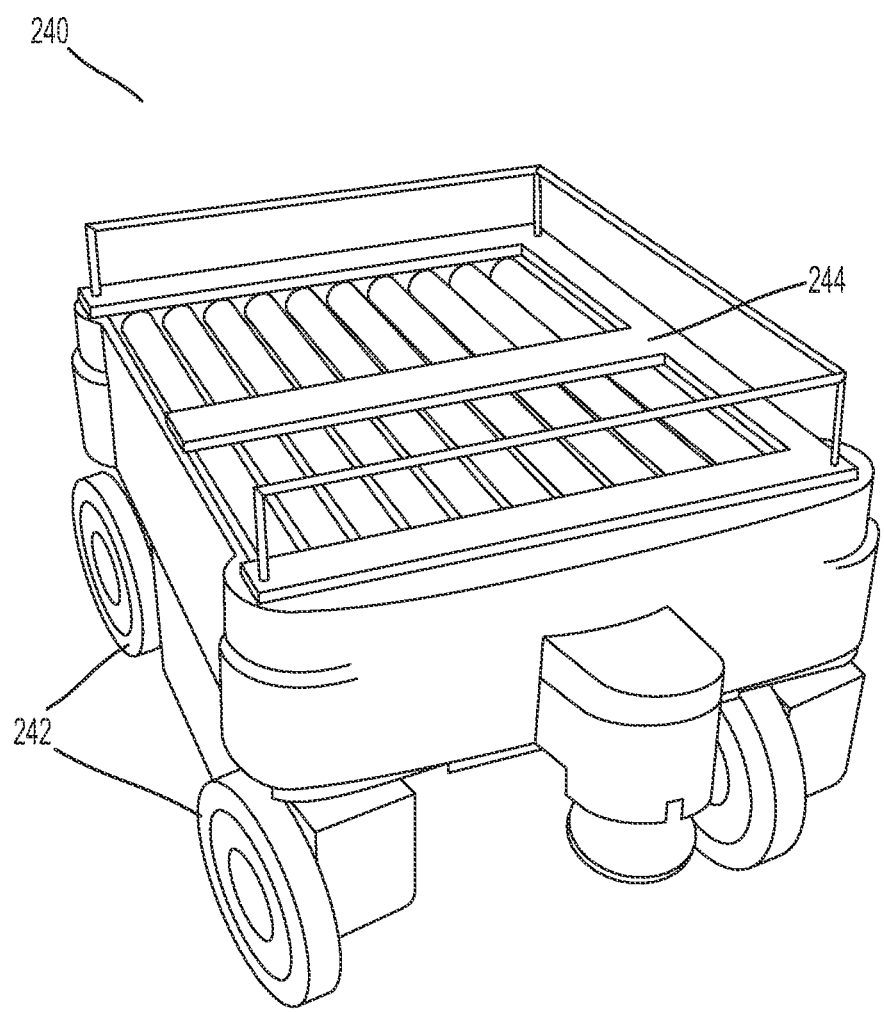
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
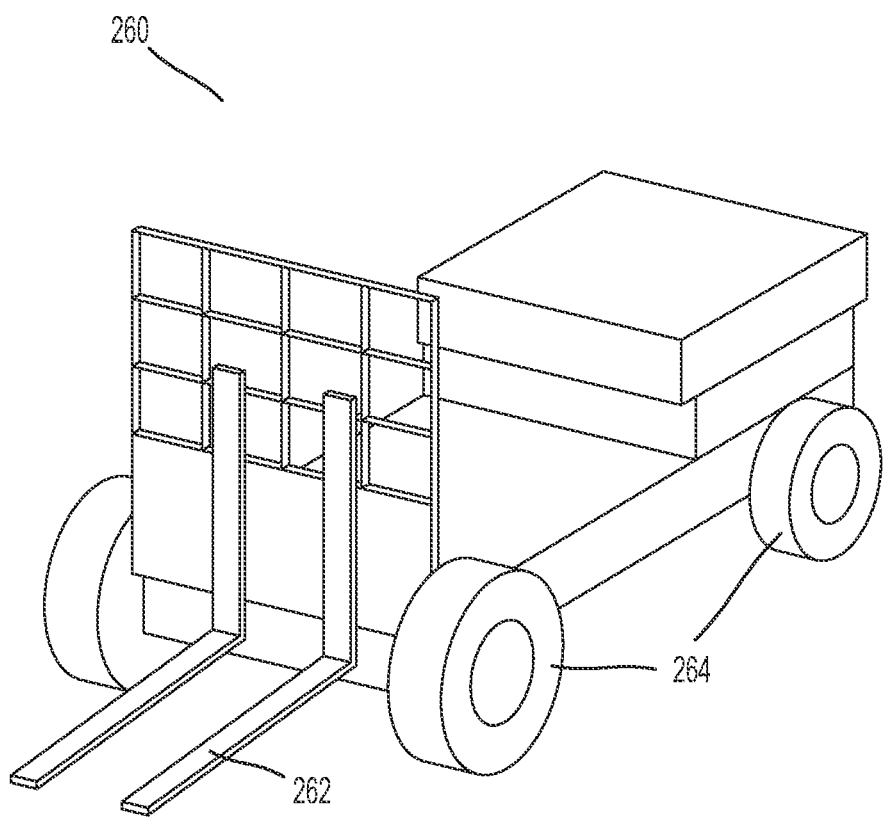
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

FIGS. 3A, 3B, 3C, 3D, and 3E collectively illustrate example operation of a robotic fleet in a warehouse, according to an example embodiment. More specifically, a robotic fleet containing different types of robots with different types of assigned tasks may be deployed within warehouse 300. Different robotic devices may operate independently at the same time according to instructions from a centralized control system or hive mind to complete jobs, such as receiving object, storing objects, retrieving objects from storage, transporting objects, delivering objects from the warehouse, or otherwise processing objects. Additionally, in some examples, two or more robotic devices may collaborate to perform jobs together, possibly leveraging specialized equipment or functionality of particular devices.

Figure 3A:
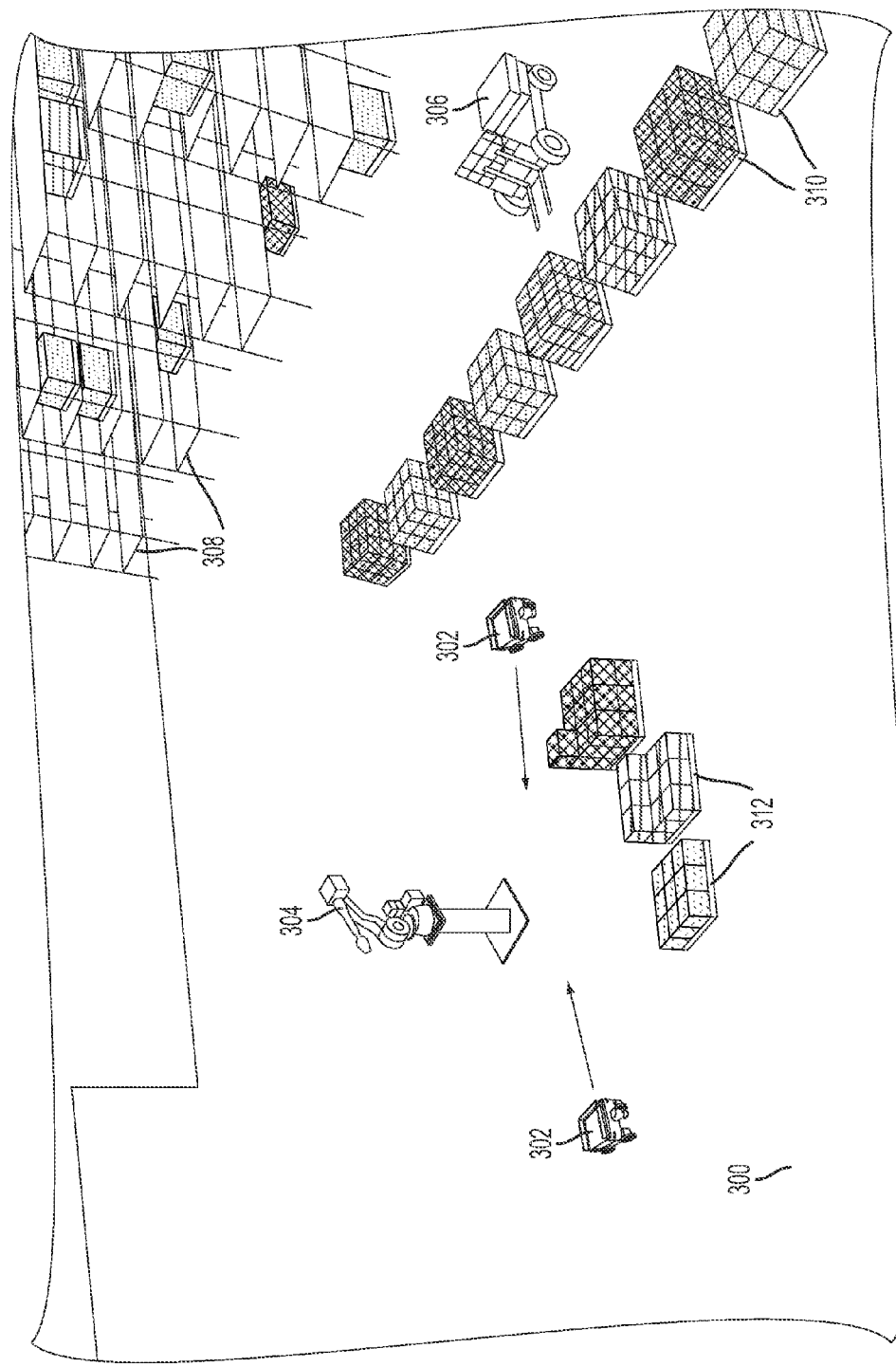
FIGS. 3A, 3B, 3C, 3D, and 3E illustrate example operation of a robotic fleet in a warehouse, according to an example embodiment.

In reference to FIG. 3A, a robotic fleet may include multiple AGV's 302 for quickly transporting small totes, such as individual boxes or objects. The AGV's 302 may be assigned by the centralized control system to move to particular areas of warehouse 300 to pick up boxes for transport to another location, such as to store the box or to move the box to a location to await delivery from the warehouse 300. In some examples, the AGV's 302 may be assigned to move within an area of reach of a fixed robotic manipulator, such as pedestal robot 304. More specifically, pedestal robot 304 may be a robotic arm that is configured to pick up or otherwise move nearby objects. In some examples, the pedestal robot 304 may be capable of constructing or deconstructing nearby pallets 312 of boxes. In additional examples, the pedestal robot 304 may be operable to remove objects from or place particular objects on the AGV's 302 once the AGV's have moved within an area of reach of the pedestal robot 304.

In further examples, different types of fixed robotic manipulation stations may be positioned within warehouse 300 as well or instead. For instance, instead of using a robotic arm with a gripper, a different type of robotic manipulator may be used, possibly depending on the types of objects stored within warehouse 300, or types of actions needed to processes those objects. In some examples, a fixed robotic manipulator may be configured to open boxes to manipulate items within the boxes as well. For instance, a warehouse may include a case containing a number of copies of a consumer product. A robotic manipulator may be capable of placing individual copies of the product into smaller boxes (possibly transported by AGVs) for shipment out of the warehouse.

The robotic fleet may additionally contain other types of mobile robotic devices for transport of different types or sizes of totes. For example, an autonomous fork truck 306 may be used to pick up and transport pallets, flat support structures upon which boxes may be stacked. In some examples, storage racks 308 within warehouse 300 may be used to store pallets of boxes, possibly pallets that are transported to and/or from the racks by autonomous fork truck 308. In additional examples, certain pallets 300 may be placed at particular locations within the warehouse 300 to await further processing. For instance, one of the pallets 300 may be left at a chosen location until a mobile robot is free to move the pallet, until a pedestal robot 300 is free to manipulate boxes on the pallet, or until a delivery truck arrives at the warehouse to transport the pallet to another location outside the warehouse.

Figure 3B:
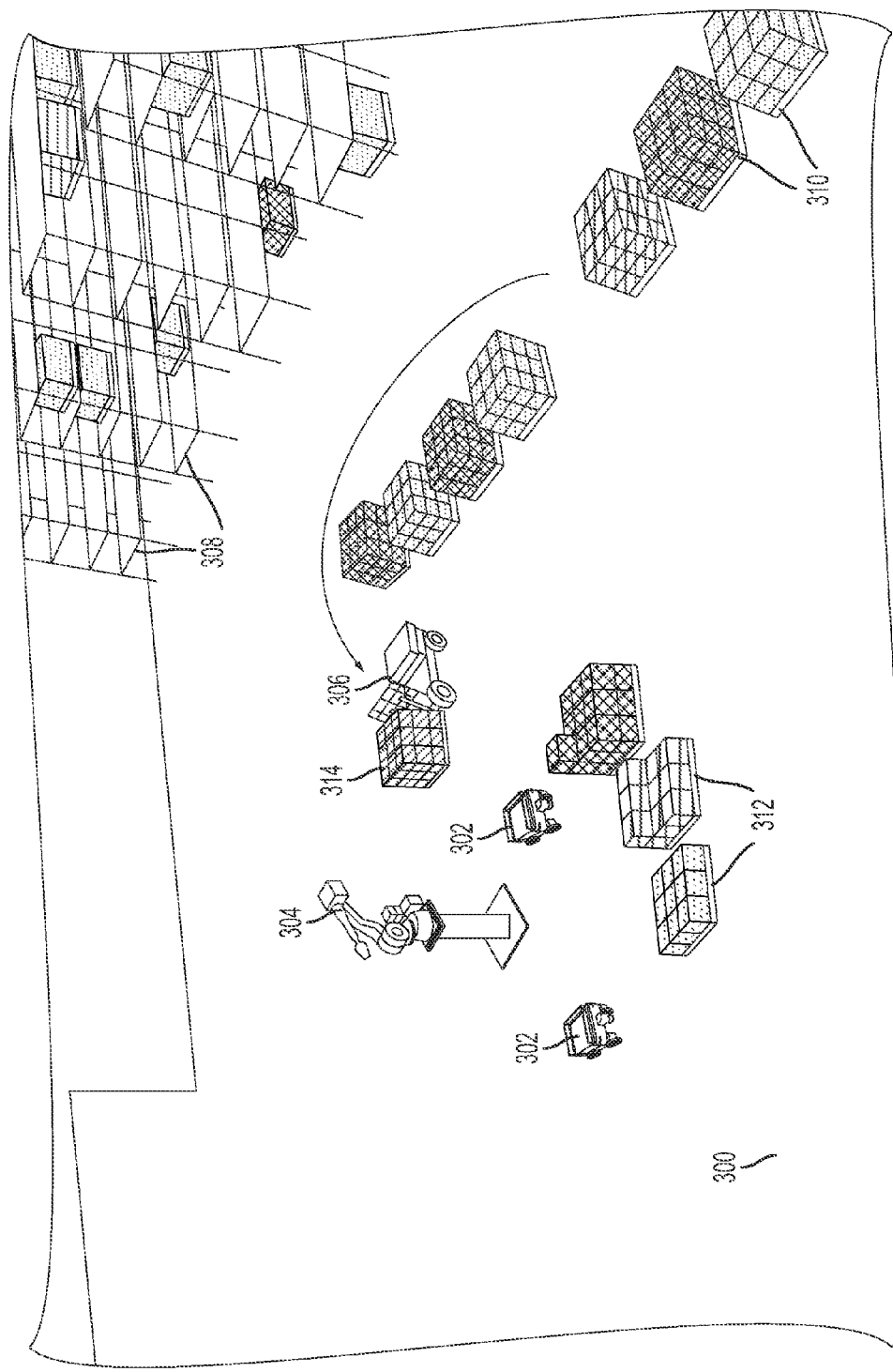

In reference to FIG. 3B, autonomous fork truck 306 may be assigned to transport a particular pallet 314 of boxes to an area within reach of pedestal robot 304. For instance, the pallet 314 may contain boxes of a particular type. By transporting the pallet 314 to a location where the pedestal robot 304 can reach it, the pedestal robot 304 may then redistribute objects from pallet 314 to other areas within reach, such as onto other pallets 312 or onto one of the nearby AGVs 302 for transport to other locations.

In some examples, the autonomous fork truck 306 may move to an area within reach of the pedestal robot 304 and may then drop off the pallet 314 on the ground at a point where the pedestal robot 304 can reach some or all of the objects on the pallet 314. In further examples, after dropping off the pallet 314, the autonomous fork truck 306 may then leave the area to perform a different task, such as to retrieve another pallet from storage racks 308 or from pallets 310 currently stored on the ground within warehouse 300. In other examples, the autonomous fork truck 306 may pick up and move a different pallet 312 within reach of 304 after dropping off pallet 314, which may be a pallet that was partially or fully constructed by pedestal robot 304.

Figure 3C:
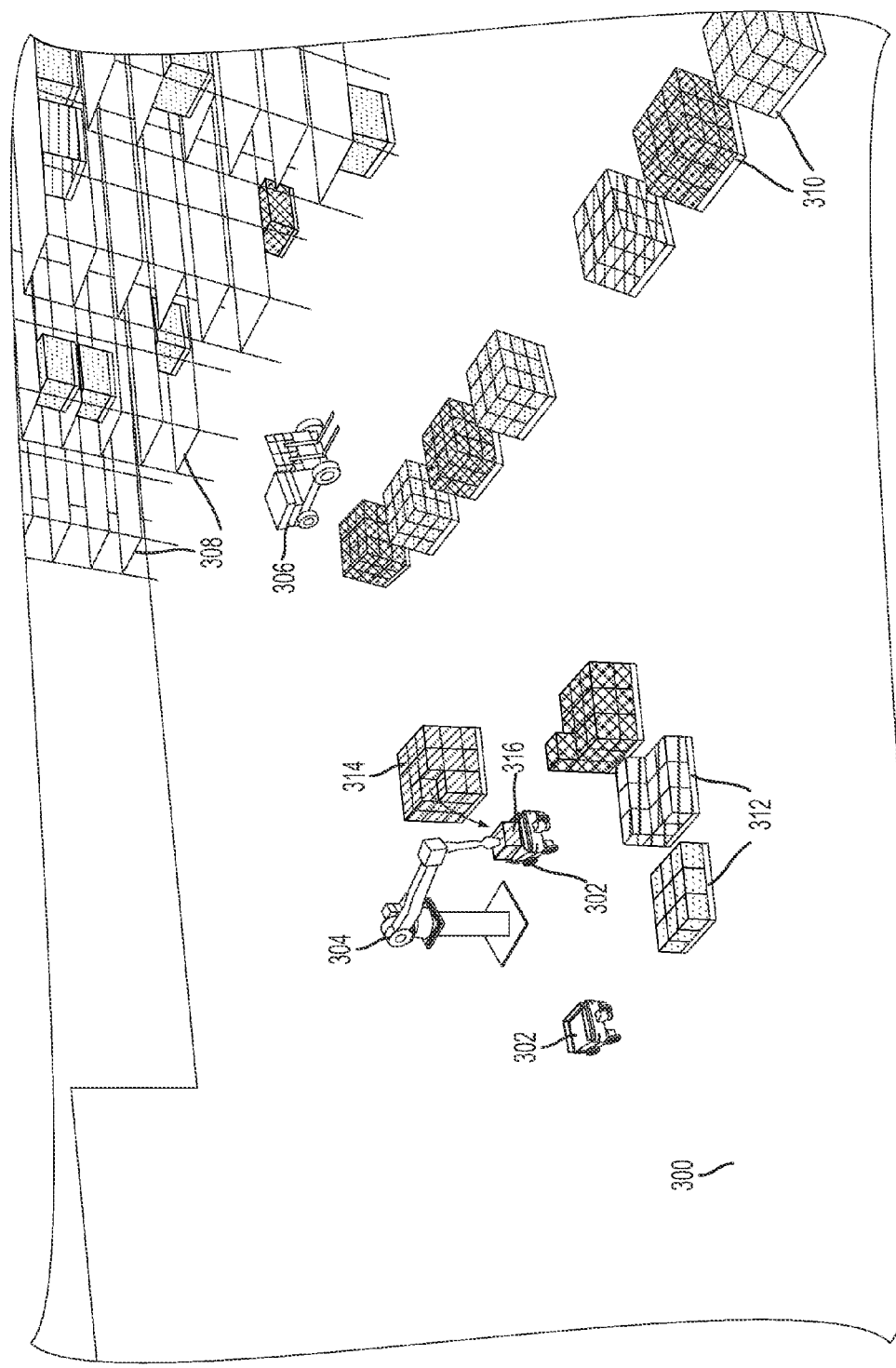

In reference to FIG. 3C, pedestal robot 304 may be assigned to transfer a box 316 from pallet 314 to AGV 302. Such a process may be repeated for other boxes in pallet 314, perhaps until the boxes of pallet 314 have been fully de-palletized. Autonomous fork truck 306 may move back to its previous position near other pallets, as shown.

Figure 3D:
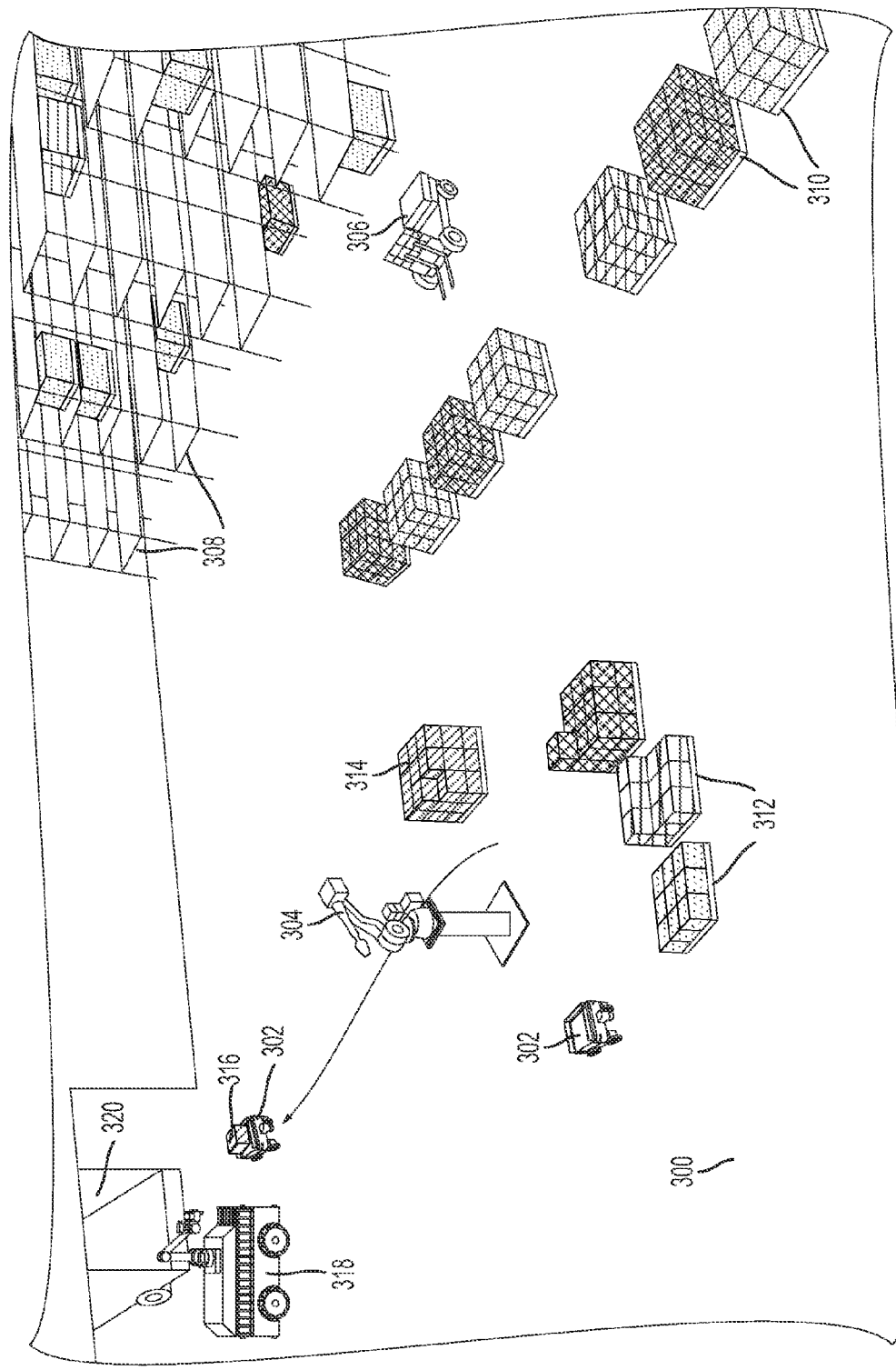
Figure 3E:
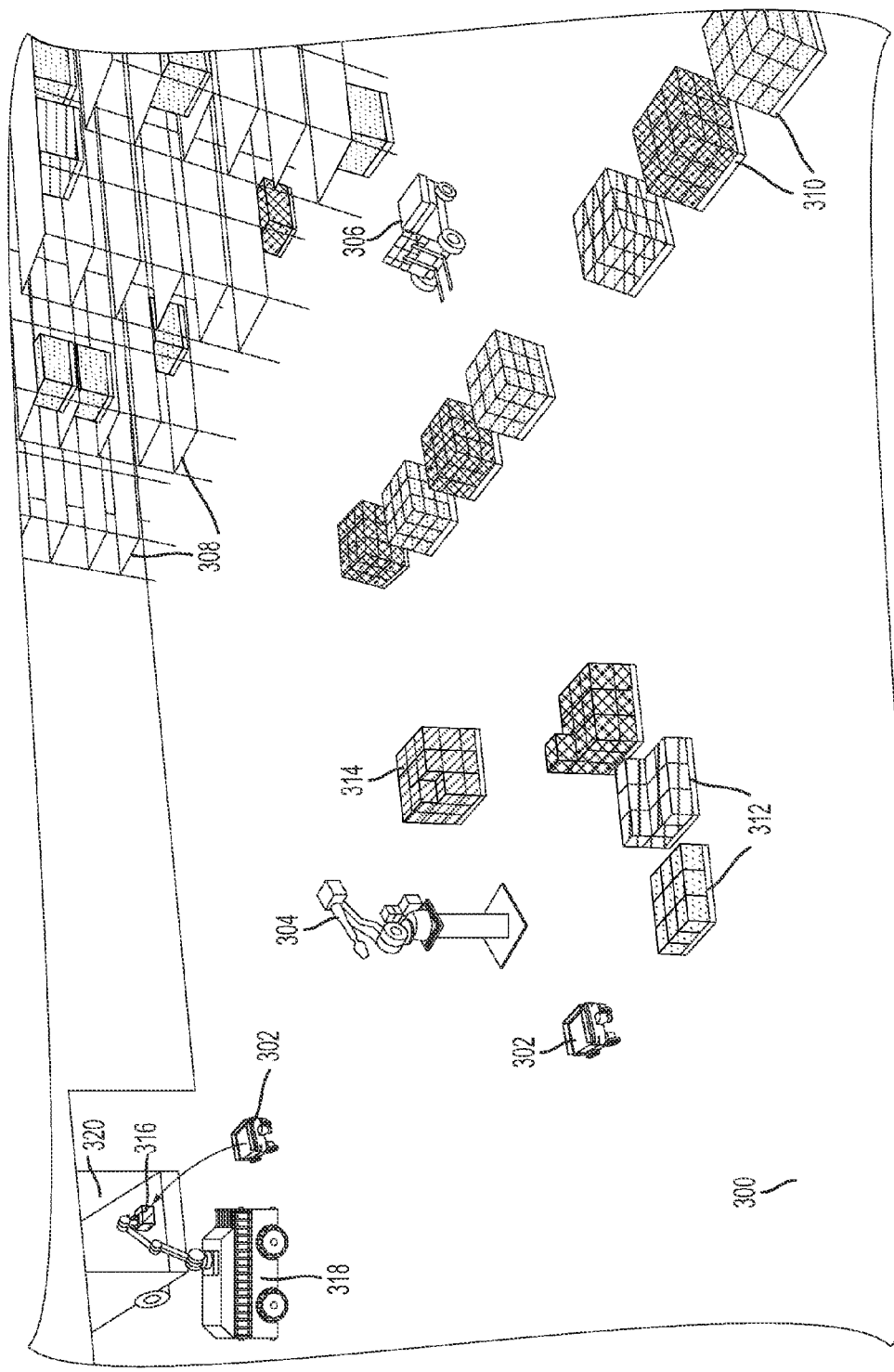

In reference to FIG. 3D, AGV 302 may be assigned to move to an area in proximity to truck 320, thereby transporting box 316 from a location near the pedestal robot 304 to a location near truck unloader 318. Then, in reference to FIG. 3E, truck unloader 318 may transfer box 316 from AGV 302 to truck 320. The AGV may then return to the area near pedestal robot 304, perhaps to receive another box for transport.

Figure 4:
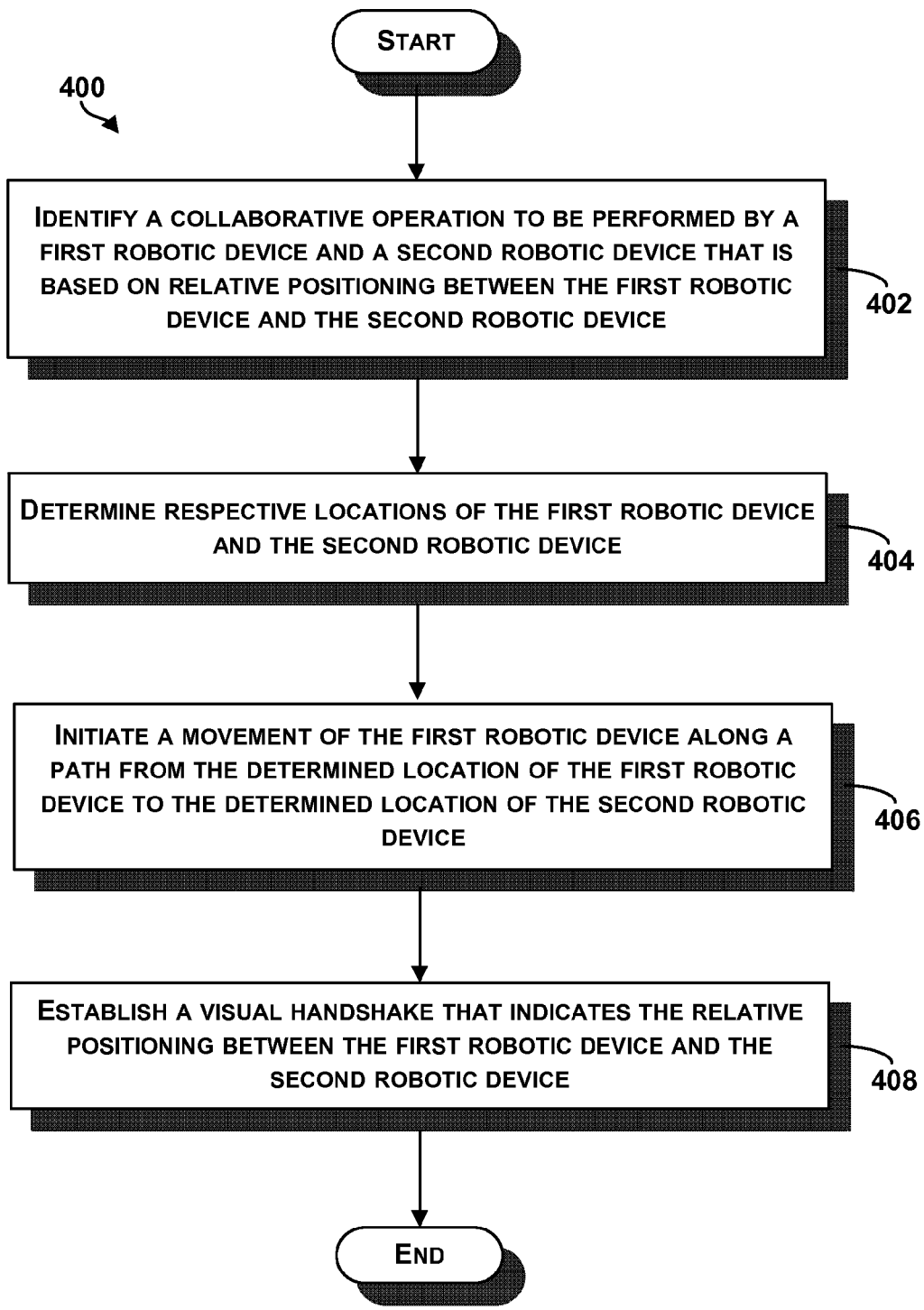
FIG. 4 is a block diagram of a method, according to an example embodiment.

FIG. 4 is a flowchart illustrating example operations. These operations, for example, could be used with a system that includes a control system that is commutatively coupled to two or more robotic devices. Some example systems and robotic devices may include, for example, the robotic fleet 100 in FIGS. 1A and 1B, the robotic truck unloader 200 in FIG. 2A, the pedestal robot 220 in FIG. 2B, the AGV 240 in FIG. 2C, the autonomous fork truck 260 in FIG. 2D, or the AGVs 302, the pedestal robot 304, and the autonomous fork truck 306 in FIGS. 3A-3E. The operations may be performed by a combination of any suitable components such as the components of robotic fleet 100 in FIGS. 1A and 1B, the robotic truck unloader 200 in FIG. 2A, the pedestal robot 220 in FIG. 2B, the AGV 240 in FIG. 2C, the autonomous fork truck 260, and/or components of any suitable system. FIG. 4 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the implementation may involve identifying a collaborative operation to be performed by a first robotic device and a second robotic device. For instance, a control system, such as global control system 150 of FIG. 1B, may identify the collaborative operation. The first robotic device and second robotic device may be any suitable robotic devices, such as the robotic truck unloader 200 in FIG. 2A, the pedestal robot 220 in FIG. 2B, the AGV 240 in FIG. 2C, or the autonomous fork truck 260 in FIG. 2D, among other examples.

In some implementations, the identified operation may be a particular type of operation that is based on relative positioning between the first robotic device and the second robotic device. Many types of collaborative operations are based on relative positioning. Some types of collaborative operations may involve determining the relative positioning so that the operation can be performed. Other types may involve positioning the first robotic device and the second robotic device at a particular distance or particular orientation. Some example collaborative operations may include transferring an object between the first robotic device and the second robotic device, navigating the first robotic device and the second robotic device in proximity to one another, or perhaps using respective tools of the first robotic device and the second robotic device in conjunction, among many other possible examples.

For example, to transfer an object between the first robotic device and the second robotic device, the relative positioning involved might be relative positioning between where the object is (e.g., in some type of payload carrying container) and where a robotic manipulator is that is to perform the transfer (e.g., a robotic arm). For instance, the operation of transferring an object from the top surface 244 of an AGV 240 by a robotic arm 222 of a pedestal robot 220 may involve positioning the AGV 240 and the pedestal robot 220 within a certain proximity and determining the relative positioning of the AGV 240 and the pedestal robot 220. Further, the transfer operation might be based on relative positioning between the top surface 244 (upon which the object to be transferred might be located) and the robotic arm 222.

As another example, to navigate the first robotic device and the second robotic device in proximity to one another, the relative positioning involved might be relative positioning between the perimeters of the first robotic device and the second robotic device. By knowing the relative positioning between the perimeters of the robotic devices, the robotic devices may avoid a collision when navigating in relatively close proximity with one another.

As a further example, to use respective tools (e.g., end-effectors) of the first robotic device and the second robotic device in conjunction, the relative positioning involved in an example collaborative operation might be relative positioning between the tools. By knowing the relative positioning of the tools, the robotic devices may operate the tools in conjunction, perhaps by operating the tools on a common work piece. While several instances of relative positioning in different operations have been provided by way of example, many operations that involve different applications of relative positioning are contemplated as well.

As noted above, a control system may include a central planning system that assigns tasks to different robotic devices. In such an implementation, identifying the collaborative operation may involve assigning a task to the first robotic device. Performing the task may involve one or more operations. Some of these operations may be collaborative operations to be performed by the first robotic device and the second robotic device. In other cases, identifying the collaborative operation may involve a control system receiving data indicating the collaborative operation. For instance, a first control system (e.g., a control system configured for robot positioning) may receive data indicating the collaborative operation from another control system (e.g., a control system includes the central planning system).

One or more of the robotic devices may perform operations to facilitate a collaborative operation. For instance, the first robotic device may receive instructions to perform a collaborative operation (perhaps, as noted above, an operation that is based on a relative positioning between the first robotic device and a second robotic device). In some cases, the first robotic device may receive the instructions from a control system, such as the global control system 150 of FIG. 1. The collaborative operation may be one of several operations involved in performing a task that is assigned to the first robotic device.

Referring back to FIG. 4, at block 404, an implementation may also involve determining respective locations of the first robotic device and the second robotic device. For instance, a control system, such as global control system 150 of FIG. 1B, may determine the respective locations of the robotic devices. Determining the respective locations of the first robotic device and the second robotic device may facilitate navigating the first robotic device and the second robotic device in range to perform a visual handshake.

As noted above, a central planning system may maintain or have access to a map of the physical environment containing robotic fleet 100 and objects undergoing processing by the robotic devices. Further, the map may be continuously updated with information about dynamic objects (e.g., moving robots and packages moved by robots). The control system may, for example, determine the respective locations of the robotic devices based on data representing such a map of the environment.

The map may indicate the locations of the robotic devices using a variety of techniques. For instance, the map may indicate the locations of the robotic devices by reference to one or more fixed reference points within the environment. Alternatively, the map may include a coordinate system (e.g., a Cartesian coordinate system). In such an example, the map may indicate the locations of the robotic devices by reference to certain sets of coordinates. For instance, the map may represent a warehouse, and the coordinate system may represent the environment within the walls of the warehouse.

In some cases, the first robotic device or the second robotic device may be in motion when the control system attempts to determine the respective locations of the first robotic device and the second robotic device. In such a case, the control system may determine, as the location of the robotic device in motion, the location toward which the robotic device is heading. As noted above, the map may include current locations of moving robots and anticipated locations of the robots in the future, which may be used to coordinate activity between robots. Such anticipated locations may be used to determine the respective locations of the robotic devices.

As shown in block 406 of FIG. 4, the implementation may further involve initiating a movement of the first robotic device along a path. For example, a control system may send instructions to the first robotic device that cause the first robotic device to move along a path from the determined location of the first robotic device towards the determined location of the second robotic device. Such a movement may further facilitate navigating the first robotic device and the second robotic device in range to perform a visual handshake. As noted above, the control system may include a central planning system.

As noted above, the central planning system may maintain or have access to a map of the physical environment. Such a map may contain information on the current configuration or placement of components within a warehouse (or across multiple warehouses) as well as information about what is anticipated in the near term. For instance, the map may include current locations of moving robots and anticipated locations of the robots in the future, which may be used to coordinate activity between robots. The map may also include current locations of items undergoing processing as well as anticipated future locations of the items (e.g., where an item is now and when the item is anticipated to be shipped out).

Based on such a map, the central planning system may determine a path from the determined location of the first robotic device towards the determined location of the second robotic device. More particularly, the central planning system may identify one or more movements for the first robotic device that navigates the first robotic device along a path through the environment so as to avoid other robots and items in the environment. In some cases, the path might be a straight line from the determined location of the first robotic device towards the determined location of the second robotic device. In other cases, the path may include variations in direction and speed in order to avoid colliding with the robots and items within the environment.

In some cases, the central planning system may simulate both the movement of the first robotic device along a variety of paths and the anticipated movements of the robots and items within the environment. Within such simulations, the control system may identify a particular path that the simulations indicate will not result in the first robotic device colliding with the robots or items as the first robotic device moves along the path.

As noted above, different robotic devices within a fleet operating in an environment may operate independently at the same time according to instructions from a centralized control system or hive mind to complete jobs. Movements within the environment by such robotic devices may determine respective path for the robotic devices such as the path noted above. For instance, referring back to FIG. 3B, autonomous fork truck 306 may be assigned to transport a particular pallet 314 of boxes to an area within reach of pedestal robot 304. Performing such a transportation may involve a central planning system determining a path from the position of autonomous fork truck 306 in FIG. 3A, to the pallet 314, and then around the other pallets towards the pedestal bot 304, as shown in FIG. 3B.

In some implementations, differences may develop between the locations of the robots and items as indicated by the map and the physical locations of the robots and items within the environment. In some cases, the best available information on a position of a robotic device or item may be an estimate based on movements from a last known location. Such positions estimates are a type of dead reckoning. Dead reckoning can, in some instances, provide the best available positioning information, but it is subject to significant errors due to many factors as both speed and direction must be accurately known at all instants for position to be determined accurately. In some cases, such errors may prevent the central planning system from navigating the robotic devices with sufficient precision to perform certain collaborative tasks. However, as will be discussed in further detail below, position information from techniques other than dead reckoning may be used to update the map to improve its accuracy.

As noted above, one or more of the robotic devices may perform operations to facilitate a collaborative operation between a first robotic device and a second robotic device. These operations may include the first robotic device receiving data indicating a path towards the second robotic device. A control system, such as the global control system 150 of FIG. 1, may send the first robotic device an indication of a path to the second robotic device, perhaps after sending the first robotic device instructions to perform a collaborative operation with the first robotic device. Based on such instructions, the first robotic device may initiate movement along the path. Such operations facilitate the collaborative operation by getting the first robotic device and second robotic device in a position in which they can establish the visual handshake.

Referring back to FIG. 4, at block 408, the implementation may additionally involve establishing a visual handshake between the first robotic device and the second robotic device. A visual handshake involves a robotic device visually-detecting a tag or other identifying mark on another robotic device. Such a visual-detection indicates the relative positioning between the two robots. In some examples, a control system may cause the first robotic device and the second robotic device to establish a visual handshake. In other cases, the first robotic device may establish the visual handshake with the second robotic device. Alternatively, the first robotic device and the second robotic device may establish the visual handshake in conjunction.

As noted above, the visual handshake indicates the relative positioning between the first robotic device and the second robotic for the collaborative operation. As noted above, many types of collaborative operations are based on relative positioning. Some types of collaborative operations involve determining the relative positioning so that the operation can be performed. Other types involve positioning the first robotic device and the second robotic device at a particular distance or particular orientation. The visual handshake indicates the relative positioning for these different types of operations.

As noted above, establishing the visual handshake involves a robotic device visually-detecting a tag or other identifying mark on an exterior surface of another robotic device. For instance, the first robotic device may detect a tag on the second robotic device by way of a camera. Alternatively, the second robotic device may detect a tag on the first robotic device. In some implementations, the handshake may be mutual in that the first robotic device may detect a tag on the second robotic device, and the second robotic device may detect a tag on the first robot device.

The robotic devices may attempt to detect the respective tags or identifying marks under various conditions. For instance, the robotic devices may begin attempting to detect tags after the map indicates that the robotic devices are within a certain pre-determined range. Alternatively, the robotic devices may attempt to detect tags at a particular time at which the central planning system has determined that the robotic devices will be in range to perform a visual handshake. In other cases, the robotic devices may attempt to detect tags based on data from a local sensor, such as a proximity sensor that indicates when an object is nearby. In other cases, the robotic devices may continually or periodically attempt to detect the tags.

The visual handshake may indicate the relative positioning of the first robotic device and the second robotic device by way of a size or position of a tag within one or images from a camera. For example, given a tag of a known size, the size of the tag within an image of the tag is proportional to the distance between the lens of the camera. Further, given a camera and lens having a known configuration (e.g., a known focal length), the size of the tag within images taken by the camera indicates the distance between the lens and the tag. In addition, given a tag of a known shape, the relative orientation of the lens to the tag may be determined based on the difference in apparent position of the tag (i.e., parallax).

To indicate the relative positioning between the robotic devices or components thereof more generally, certain information about the relative positioning between the visual sensors and the tags may be known. For instance, respective distances and orientations between a camera of the first robotic device and various components on the first robotic device could be pre-determined. Such components could include, for example, a payload container, a robotic manipulator, or a perimeter of a robotic device. Given the distance and orientation between the lens of the camera of the first robotic device and the tag on the second robotic device as indicated by a visual handshake, the system may determine the respective distances and orientations between the tag on the second robotic device to the various components on the first robotic device.

Likewise, respective distances and orientations between the tag on second robotic device and various components on the second robotic device could be pre-determined, by which the system may determine distances and orientations between the components on the first device and the components on the second device. Such information indicating the relative positioning of the components could be maintained in a database or other data storage that is accessible to the robotic devices, the control system, or both.

In some cases, a first robotic device may detect two or more tags on a second robotic device. Detecting more than one tag may improve the determination of relative positioning in some circumstances, as multiple distance and orientations may be determined based on respective tags. Such calculations may then be analyzed (e.g., averaged) to determine the relative positioning between the robotic devices. Further, multiple detected tags could be used to determine relative positioning by triangulation. As noted above, the respective distances and angles between tags on a robotic device may be pre-determined. In combination with respective distances between a camera and two tags on a robotic device, such pre-determined distances and angles may indicate various other distances and orientations between components of the robotic devices by way of triangulation.

A control system, such as the global control system 150 of FIG. 1, may perform various operations to facilitate the first robotic and the second robotic device performing the visual handshake. For instance, the control system may cause the first robotic device to orient a camera or other visual sensor towards the determined location of the second robotic device. To enable such orientation, the camera may be mounted on a mount that can be re-oriented (e.g., a rotatable mount). Such an operation may increase the likelihood that images captured by the camera of the first robotic device will depict a tag on the second robotic device. In some cases, the control system may cause the second robotic device to orient a camera along a path along which the first robotic device is moving toward the second robotic device (e.g., a path from the determined location of the first robotic device to the determined location of the second robotic device). Such an operation may increase the likelihood that images captured by the camera of the second robotic device will depict a tag on the first robotic device. In some cases, the control system may cause the robotic devices to perform such operations by sending instructions that cause the devices to perform the operations or by sending data indicating information by which the robotic devices may perform the operations (e.g., the determined locations of the robotic devices).

As noted above, a central planning system may send instructions to a first robotic device to perform a collaborative operation. For instance, the first robotic device may receive data indicating a direction in which the second robotic device is located relative to the first robotic device. The central planning system may determine such a direction based on the map, and then send data indicating the direction to the first robotic device. The first robotic device may then orient a camera in the direction indicated by the received data.

To then establish a visual handshake, the first robotic device may cause the camera to capture images. Such an operation may cause the camera to generate data representing images from a viewpoint that is oriented in the direction in which the second robotic device is located relative to the first robotic device. Within such data, the robotic device may detect one or more particular images that depict a tag (perhaps on an exterior surface of the second robotic device). Then, as noted above, the robotic device may determine the relative positioning or orientation between the first robotic device and the second robotic device based on the size and orientation of the tag within the images and/or based on triangulation with multiple tags.

Figure 5:
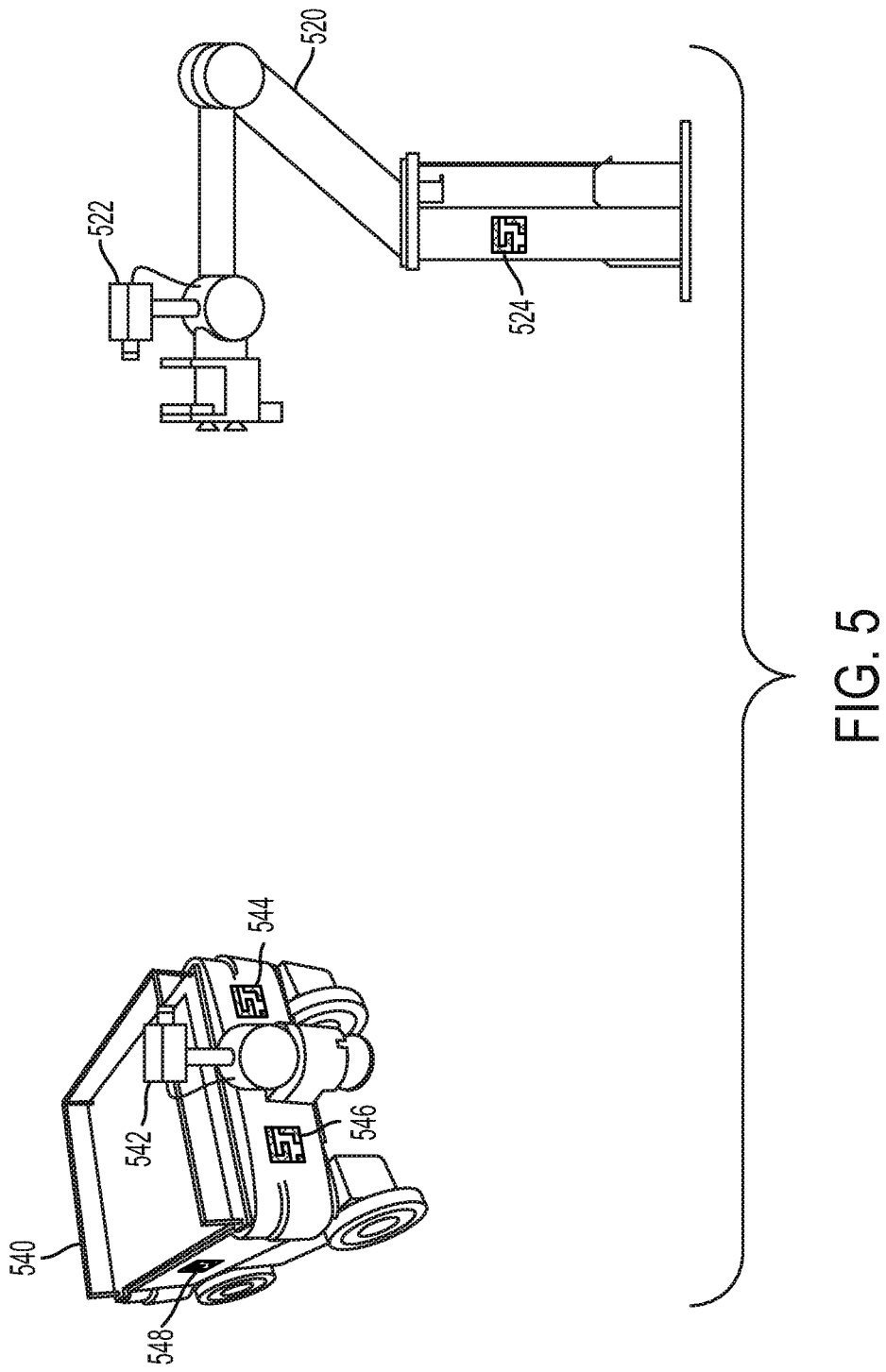
FIG. 5 shows example robotic devices, which may perform a visual handshake that indicates relative positioning of the robotic devices.

As noted above, an example collaborative operation may involve transferring an object between the first robotic device and the second robotic device (e.g., picking an object from a container). FIG. 5 shows AGV 540 and pedestal robot 520, which might be instances of AGV 240 of FIG. 2C and pedestal robot 220 of FIG. 2B, respectively. An example operation may involve the pedestal robot 520 transferring an object from AGV 540 (e.g., the pedestal robot 520 may include a robotic arm with an end-effector-mounted gripper as shown, which may transfer an object from a top surface of AGV 540). The relative positioning involved in such an operation may include relative positioning between the robotic arm of pedestal robot 240 and the top surface of AGV. After establishing a visual handshake that indicates the relative positioning of a location of the container of AGV 540 (i.e., the top surface) to a robotic manipulator of pedestal robot 520 (i.e., the robotic arm), a control system may cause the robotic arm to pick the object to be transferred from the top surface of AGV 540.

Other example operations are possible as well. For example, another operation may involve transferring the object to a target location on a robotic device. For example, a pedestal robot could pick an object from a pallet, and transfer the object to AGV 540 after establishing a visual handshake that indicates the relative positioning of the target location to the robotic manipulator. Yet another relative positioning involved in the operation may be relative positioning between a perimeter of the AGV 540 and the pedestal of pedestal robot 520, as determining such a relative positioning may prevent a collision between pedestal robot 520 and the AGV 540.

To establish a visual handshake, AGV 540 and pedestal robot 520 may mutually detect tags on the respective robotic devices, as described above. More particularly, a control system may orient camera 542 of AGV 540 at pedestal robot 520. The control system may detect tag 524 in one or more images captured by camera 542. Likewise, a control system may orient camera 522 of pedestal robot 520 at AGV 540 to detect one or more of tag 544, 546, or 548 in one or more images captured by camera 522. For instance, the control system may detect tag 544. Such a visual handshake may indicate the relative positioning, as noted above.

Figure 6:
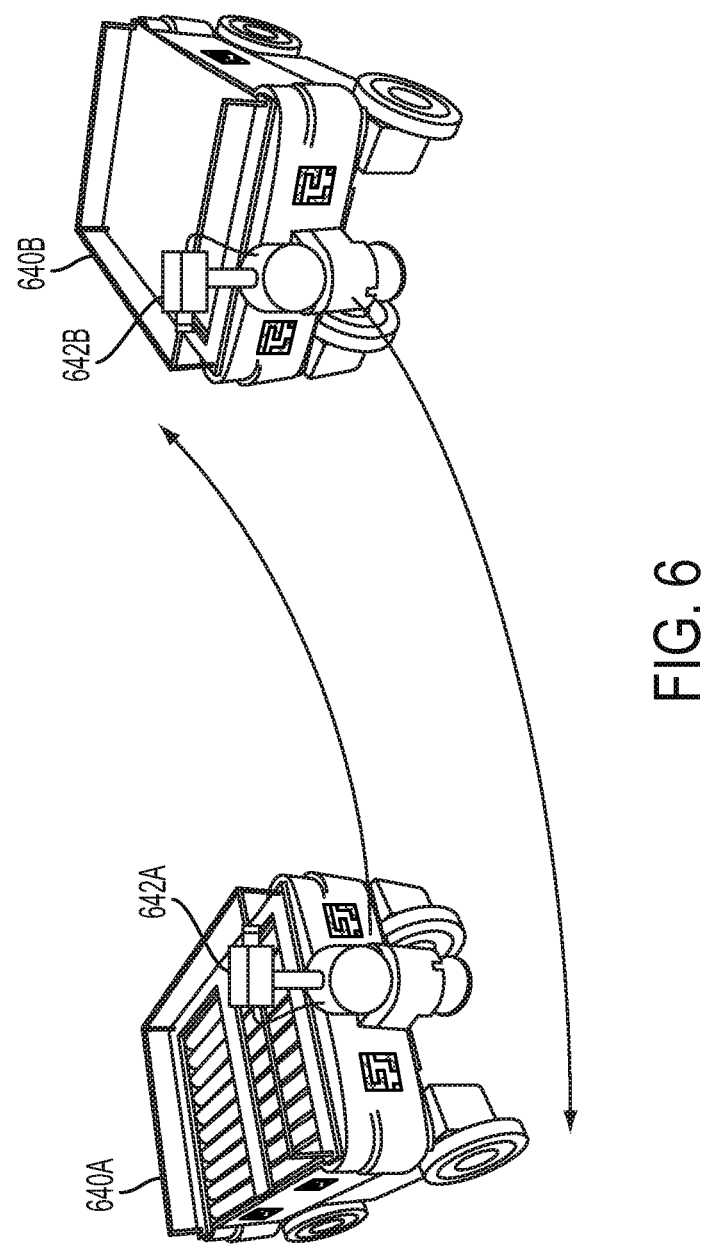
FIG. 6 shows additional example robotic devices, which may perform a visual handshake that indicates relative positioning of the robotic devices.

Another collaborative operation may involve navigating a first robotic device and a second robotic device in proximity to one another (e.g., past one another). FIG. 6 shows AGV 640A and AGV 640B, which may be instances of AGV 240 of FIG. 2C. An example operation may involve navigating AGV 640A and AGV 640B past one another so as to not collide AGV 640A and AGV 640B. AGVs such as AGV 640A and AGV 640B may navigate past one another during the performance of tasks, such as the tasks performed in warehouse 300 that are shown in FIGS. 3A-3E. The relative positioning involved in such operations may include relative positioning of the respective perimeters of AGV 640A and AGV 640B.

To establish a visual handshake, AGV 640A and AGV 640B may mutually detect tags on the respective robotic devices, as described above. For instance, during movement, respective control systems of AGV 640A and AGV 640B may orient camera 642A and camera 642B in the direction of movement. Such an operation may facilitate detecting respective tags of robotic devices that the robot device may come into proximity with during the movement (e.g., tags on AGV 640A and AGV 640B). After establishing the mutual handshake, one or more control systems may determine the relative positioning between AGV 640A and AGV 640B at one or more instances as AGV 640A and AGV 640B navigate past one another. Such relative positioning may facilitate navigating AGV 640A past AGV 640B such that AGV 640A is at least a threshold distance from AGV 640B during the navigation, which may prevent a collision between AGV 640A and AGV 640B.

As noted above, some types of collaborative operations may involve positioning a first robotic device at a particular distance or orientation with respect to a second robotic device. Accordingly, such robotic devices may establish a visual handshake that indicates a relative positioning between the first robotic device and the second robotic device. A control system may then determine that an offset exists from the relative positioning between the first robotic device and the second robotic device indicated by the handshake and the particular distance or orientation required by the collaborative operation. The control system may then cause the first robotic device or the second robotic device to re-position itself such that the first robotic device is at the particular distance or orientation with respect to the second robotic device.

To identify a particular robotic device among the robotic devices operating in the environment, the tag or mark may be coded to convey identifying information. In some cases, the tag may be coded using a pattern of symbols, such as a bar code, a QR (Quick Response) code, or an ARTag. Each tag may indicate a unique code. A database or other data storage may contain a table or other data structure linking the unique codes to particular robots. Some robots may have multiple tags, so in some cases the database may contain multiple entries for each robot that indicate the positions of each tag on the robot (e.g., that a tag having a first QR code indicates a particular container on an AGV, or that another tag having a second QR code indicates a pedestal of a pedestal robot).

Figure 7:
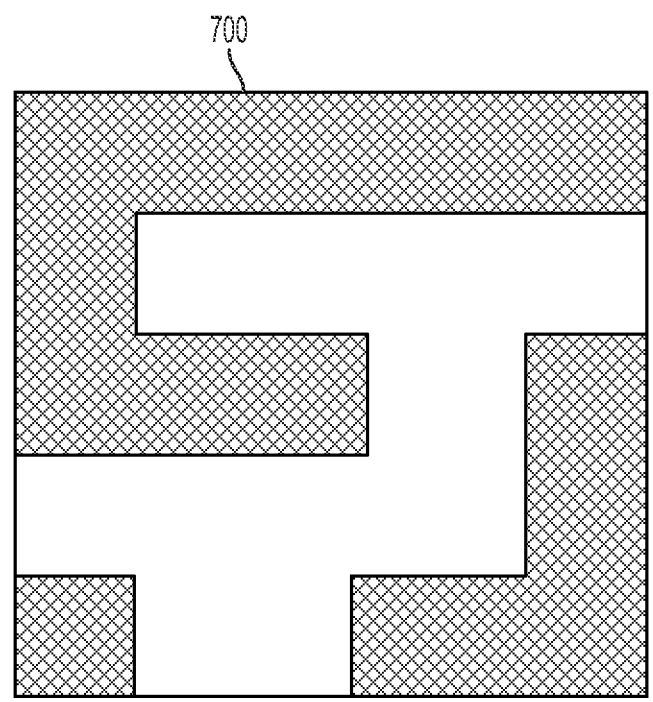
FIG. 7 shows an example ARTag, which may facilitate a visual handshake.

As mentioned above, the tag may be an ARTag. FIG. 7 shows an example ARTag 700. As shown, ARTag contains a pattern of white and black blocks within a square. The pattern of white and black blocks may vary between ARTags to indicate different codes. The ARTags used in a system may have a consistent size, which may facilitate determining the distance between an ARTag depicted in an image and a lens of a camera that captured the image, as described above.

Some example systems may include a control system (e.g., a global control system having a central planning system) communicatively coupled to a first robotic device and a second robotic device. As described above, such a global control system may send instructions to the robotic devices by way of such a communicative connection. For instance, the global control system may cause the robotic devices to perform operations that facilitate the robotic devices establishing a visual handshake, such as positioning the robotic devices according to data that indicates a map of the environment in which the robotic devices are operating. In some cases, after establishing a visual handshake, the global control system may transfer movement control to respective control systems of the robotic devices. These "local" control systems may then position the robotic devices based on the relative positioning for the collaborative operation indicated by the visual handshake. After performing the collaborative operation, movement control may transfer back to the global control system.

The communicative connection may also facilitate various operations of the robotic devices. For instance, a first robotic device may detect a tag on a second robotic device, and then notify the second robotic device that the first device has detected the tag, perhaps by sending data over the communicative connection indicating that the first device has detected the tag. Further, the first robotic device may receive data indicating that the second robotic device has detected a tag on the first robotic device. Such operations may indicate to the first robotic device and the second robotic device that a mutual visual handshake has been established between the first robotic device and the second robotic device.

As indicated above, in some cases, errors may exist between the positions of the robotic devices indicated by the map and the actual positions of the map within the environment. In some cases, the relative positioning indicated by visual handshakes may be used to correct such errors in the map. For example, a robotic device may establish a visual handshake that indicates a distance and orientation from a second robotic device. The robotic device may send data indicating such a relative positioning to the global control system. The global control system may determine that the map indicates a relative positioning between the first robotic device and the second robotic device that is different from the relative positioning indicated by the visual handshake. The global control system may then update the map to correct the offset such that the map indicates the relative positioning indicated by the visual handshake (perhaps because that relative positioning is assumed to be more accurate than the global positioning). In such an example, updating the map may involve changing the location of the first robotic device or the second robotic device within the map. Certain logic may dictate which locations are updated. For instance, if the first robotic device is mobile and the second robotic device is stationary, the global control system may update the location of just the first robotic device.

Further, in some cases, tags may be placed on stationary objects or walls. Such tags may provide reference points for updating the map with positions of mobile robots and objects. For instance, as an AGV is moving around an environment (e.g., warehouse 300 of FIGS. 3A-3E), the AGV may periodically attempt to detect tags that have been placed around the environment at various reference points. The respective locations of these reference points may be indicated on the map. When a tag is detected, the AGV may perform a visual handshake with the tag to determine the relative positioning between the AGV and the tag. The AGV may send data indicating the determined relative positioning to the global control system, which may update the location of the AGV within the map based on the relative positioning. While an AGV has been described by way of example, other types of robotic devices may perform similar operations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    identifying, by a control system, a collaborative operation to be performed by a first robotic device and a second robotic device, wherein the collaborative operation is based on a relative positioning between the first robotic device and the second robotic device;
    based on data representing a map of an environment in which the first robotic device and the second robotic device are operating, determining, by the control system, respective locations, relative to the map, of the first robotic device and the second robotic device, wherein the map is updated in response to movements of the first robotic device and the second robotic device relative to the environment;
    initiating, by the control system, a movement of the first robotic device along a path from the determined respective location of the first robotic device relative to the map towards the determined respective location relative to the map of the second robotic device; and
    after initiating the movement, causing, by the control system, the first robotic device and the second robotic device to establish a visual handshake that indicates the relative positioning between the first robotic device and the second robotic device for the collaborative operation.

2. The method of claim 1, wherein causing the first robotic device and the second robotic device to establish the visual handshake comprises:
    causing the second robotic device to orient a camera along the path from the determined respective location of the first robotic device relative to the map towards the determined respective location of the second robotic device.

3. The method of claim 1, wherein causing the first robotic device and the second robotic device to establish the visual handshake comprises:
    causing the first robotic device to orient a camera towards the determined respective location of the second robotic device.

4. The method of claim 1, wherein causing the first robotic device and the second robotic device to establish the visual handshake comprises:
    causing a camera of the first robotic device to generate data representing images from a viewpoint that is oriented towards the determined respective location of the second robotic device relative to the map;
    based on the data representing the images from the viewpoint that is oriented towards the determined respective location of the second robotic device relative to the map, detecting one or more particular images that depict a tag on an exterior surface of the second robotic device; and
    based on respective sizes and positions of the tag within the one or more particular images, determining the relative positioning between the first robotic device and the second robotic device.

5. The method of claim 1, wherein the collaborative operation involves positioning the first robotic device at a particular distance from the second robotic device, the method further comprising:
    causing at least one of the first robotic device and the second robotic device to move from the relative positioning indicated by the visual handshake to a relative positioning in which the first robotic device is at the particular distance from the second robotic device.

6. The method of claim 1, wherein the collaborative operation involves positioning the first robotic device at a particular orientation with respect to the second robotic device, the method further comprising:
    causing at least one of the first robotic device and the second robotic device to move from the relative positioning indicated by the visual handshake to a relative positioning in which the first robotic device is at the particular orientation with respect to the second robotic device.

7. The method of claim 1, wherein the collaborative operation further involves positioning an end-effector of the first robotic device at a particular position relative to an end-effector of the second robotic device, and wherein the visual handshake further indicates a relative positioning between the end-effector of the first robotic device and the end-effector of the second robotic device.

8. The method of claim 1, wherein the collaborative operation involves navigating the first robotic device along a path that intersects a given proximity of the second robotic device, the method further comprising:
    based on the relative positioning between the first robotic device and the second robotic device indicated by the visual handshake, navigating the first robotic device past the second robotic device such that the first robotic device is at least a threshold distance from the second robotic device during the navigation.

9. The method of claim 1, further comprising:
    after establishing the visual handshake that indicates the relative positioning between the first robotic device and the second robotic device, transferring movement control of the first robotic device from the control system to a local control system of first robotic device.

10. A first robotic device comprising:
    a communications interface;
    one or more processors; and
    data storage configured to store instructions, that when executed by the one or more processors, cause the first robotic device to:
    receive instructions to perform a collaborative operation that is based on a relative positioning between the first robotic device and a second robotic device;
    receive, over the communications interface, data indicating a path towards the second robotic device, wherein the path is determined based on data representing a map of an environment in which the first robotic device and the second robotic device are operating, and wherein the map is updated in response to movements of the first robotic device and the second robotic device relative to the environment;

responsive to receiving the data indicating the path towards the second robotic device, initiate movement of the first robotic device along the path determined based on data representing the map towards the second robotic device; and after initiating the movement of the first robotic device along the path, establish a visual handshake with the second robotic device that indicates the relative positioning between the first robotic device and the second robotic device for the collaborative operation.

11. The first robotic device of claim 10, wherein the instructions further cause the first robotic device to:

receive data indicating a direction in which the second robotic device is located relative to the first robotic device; and orient a camera in the direction in which the second robotic device is located relative to the first robotic device.

12. The first robotic device of claim 10, wherein the first robotic device further comprises a camera, and wherein the instructions further cause the first robotic device to:

cause the camera to generate data representing images from a viewpoint that is oriented in the direction in which the second robotic device is located relative to the first robotic device;

based on the data representing the images, detect one or more particular images that depict a tag on an exterior surface of the second robotic device; and based on respective sizes of the tag within the one or more particular images, determine the relative positioning between the first robotic device and the second robotic device.

13. The first robotic device of claim 10, wherein establishing the visual handshake with the second robotic device comprises:

determining the relative positioning between the first robotic device and the second robotic device; and sending data indicating the relative positioning between the first robotic device and the second robotic device to the second robotic device.

14. The first robotic device of claim 10, wherein establishing the visual handshake with the second robotic device comprises:

sending, to the second robotic device, data indicating that the first robotic device has detected a tag on the second robotic device; and receiving data indicating that the second robotic device has detected a tag on the first robotic device.

15. A system comprising:

a computing system communicatively coupled to a first robotic device and a second robotic device, the computing system configured to:

identify a collaborative operation to be performed by a first robotic device and a second robotic device, wherein the collaborative operation is based on a relative positioning between the first robotic device and the second robotic device;

based on data representing a map of an environment in which the first robotic device and the second robotic device are operating, determine respective locations, relative to the map, of the first robotic device and the second robotic device, wherein the map is updated in response to movements of the first robotic device and the second robotic device relative to the environment; and initiate a movement of the first robotic device along a path from the determined location of the first robotic device towards the determined respective location relative to the map of the second robotic device; and the first robotic device and second robotic device configured to:

establish a visual handshake that indicates the relative positioning between the first robotic device and the second robotic device for the collaborative operation.

16. The system of claim 15, wherein the computing system is further configured to:

receive data indicating the relative positioning indicated by the visual handshake; and determine that the map indicates a relative positioning between the first robotic device and the second robotic device that is offset from the relative positioning indicated by the visual handshake; and update the map of the environment to correct the offset such that the map indicates the relative positioning indicated by the visual handshake.

17. The system of claim 15, wherein the computing system is further configured to:

initiate a movement of the second robotic device along a path from the determined location of the first robotic device towards a target location at which to perform the collaborative operation;

wherein determining the respective locations, relative to the map, of the first robotic device and the second robotic device comprises:

identifying the location of the second robotic device as the target location.

18. The system of claim 15, wherein:

the second robotic device comprises a robotic manipulator;

the collaborative operation involves transferring an object from the second robotic device to the first robotic device;

the visual handshake further indicates a target location on the first robotic device for the object; and the second robotic device is configured to:

after establishing the visual handshake, cause the robotic manipulator of the second robotic device to transfer the object to the target location on the first robotic device.

19. The system of claim 15, wherein:

the first robotic comprises a container configured to hold one or more objects;

the second robotic device comprises a robotic manipulator;

the collaborative operation involves picking an object from the container of the first robotic device;

the visual handshake further indicates a location of the container on the first robotic device relative to the robotic manipulator of the second robotic device; and the second robotic device is configured to:

after establishing the visual handshake, cause the robotic manipulator of the second robotic device to pick the object from the container of the first robotic device.

20. The system of claim 15, wherein the second robotic device comprises a camera that is mounted to a moveable end of a robotic manipulator, the second robotic device further configured to;

receive data indicating a particular direction in which the first robotic device is located; and cause the robotic manipulator to orient the camera in the particular direction to detect a tag on an exterior surface of the first robotic device.

\* \* \* \* \*